Nov. 11, 1924.
W. C. CLINE
TRANSMISSION BAND
Filed April 2, 1924
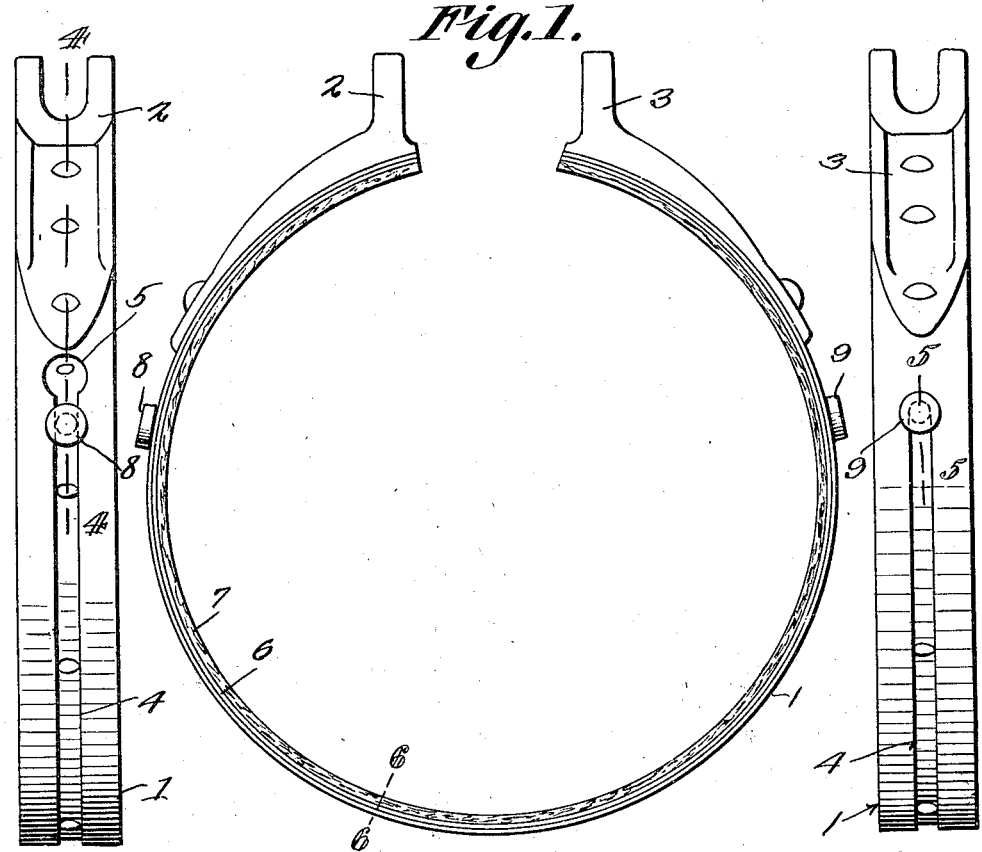
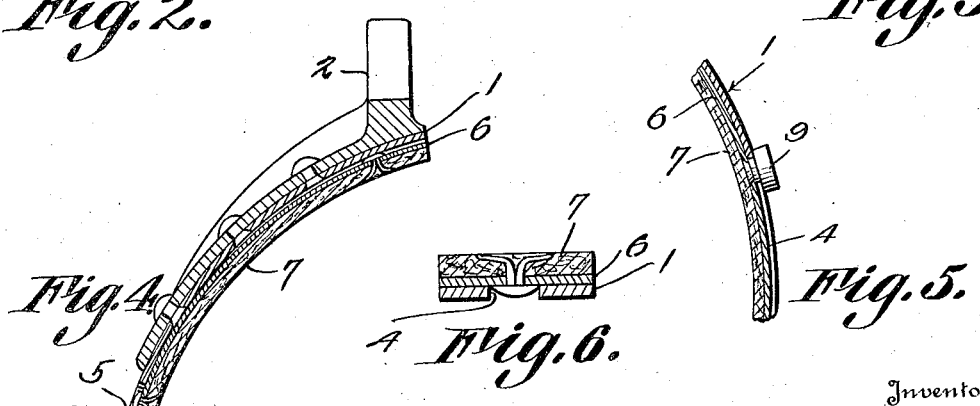
Inventor
W. C. Cline
By C. A. Snow & Co.
Attorneys Patented Nov. 11, 1924.

1,514,895

UNITED STATES PATENT OFFICE.

WEBSTER CLINTON CLINE, OF SLATE RUN, PENNSYLVANIA.

TRANSMISSION BAND.

Application filed April 2, 1924. Serial No. 703,769.

*To all whom it may concern:*

Be it known that I, WEBSTER C. CLINE, a citizen of the United States, residing at Slate Run, in the county of Lycoming and State of Pennsylvania, have invented a new and useful Transmission Band, of which the following is a specification.

This invention relates to linings for brake or transmission bands especially of the type now commonly used on Ford automobiles.

Much difficulty is experienced when the linings become worn for the reason that they are riveted to the brake or transmission bands and it is to overcome this objection and provide for the quick removal and application of these linings that this invention is designed. This is overcome by the provision of a removable inner band which carries the brake lining and which is adapted to be slid endwise and held at its ends against the brake band.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a brake or transmission band constructed in accordance with this invention;

Fig. 2 is an edge view viewed adjacent one of the end lugs of the band;

Fig. 3 is a similar view looking at the opposite end of the band;

Fig. 4 is a detail longitudinal section taken on the line 4—4 of Fig. 2;

Fig 5 is a similar view taken on the line 5—5 of Fig. 3; and

Fig. 6 is a transverse section taken on the line 6—6 of Fig. 1.

In the embodiment illustrated a brake or transmission band is shown at 1 which is equipped with the usual upstanding open slotted end lugs 2 and 3 riveted thereon in the usual manner. This band 1 has a slot 4 formed substantially throughout its length and located preferably in the transverse center of the band. This slot 4 terminates at one end in an enlarged opening 5 arranged adjacent one of the end lugs while the other end of the slot terminates at the other side of the band at a point spaced from the end lug at this side as is shown clearly in Fig. 3.

An inner flexible band 6 has the brake lining 7 riveted or otherwise secured thereto. This inner band 6 is provided on its outer face at points spaced from its ends with headed studs 8 and 9 which are adapted to slide in the slot 4 the head of stud 9 being entered through the opening 5 and the band moved endwise relatively to the band 1 until said stud 9 abuts the end wall of slot 4 as shown in Figs. 3 and 5. These headed studs 8 and 9 are positioned apart a distance corresponding to the length of slot 4 so that when the inner band 6 carrying the lining 7 is applied stud 9 will be located at the smaller end of the slot while stud 8 will be located in the slot adjacent the point where it merges into the opening 5 so that when the end lugs are brought together in the application of the band the inner lining carrying band will be securely held engaged therewith.

When it is desired to remove the inner lining carrying band the bolt connecting the lugs 2 and 3 is slackened and the band 6 moved endwise after first releasing stud 8 therefrom by passing it out through opening 5. This endwise movement of band 6 is continued until stud 9 reaches the opening 5 when it may be readily slipped out through said opening and band 6 may be replaced by another having a new lining, in the manner above described.

It is of course understood that the worn out lining 7 may be removed from the band 6 and a new lining applied thereto, this operation being performed when the mechanic has time to do so without delaying the relining of the band 1.

This construction of band adapts it for use by a car owner so that it will not be necessary to take the car to a mechanic when new brake linings are required.

I claim:—

1. The combination of a brake or transmission band having a slot extending lengthwise of said band with an enlargement at one end of said slot, a removable inner brake lining band having spaced headed studs on its outer surface to slide in said slot, said studs being spaced apart a distance corresponding to the length of the slot minus the enlargement.

2. The combination of a brake or transmission band having lugs at its ends and a slot extending lengthwise thereof, said slot terminating at one end in an enlargement located adjacent one of the end lugs and the other end of said slot terminating at a point spaced from the other end lug, a removable flexible inner brake lining band having headed studs on its outer face to slide in said slot, said studs being spaced apart a distance corresponding to the length of said slot minus the enlarged opening therein whereby the heads of the studs may be inserted through said opening and held engaged with the slots when applied.

In testimony that I claim the foregoing as my own, I have hereto affixed my signature in the presence of two witnesses.

WEBSTER CLINTON CLINE.

Witnesses:
A. G. MARTINO,
M. L. McWILLIAMS.